(12) United States Patent
Yokoyama et al.

(10) Patent No.: US 8,019,474 B2
(45) Date of Patent: Sep. 13, 2011

(54) LEGGED MOBILE ROBOT CONTROL SYSTEM

(75) Inventors: Taro Yokoyama, Wako (JP); Sachie Hashimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1020 days.

(21) Appl. No.: 11/637,000

(22) Filed: Dec. 12, 2006

(65) Prior Publication Data

US 2007/0150108 A1      Jun. 28, 2007

(30) Foreign Application Priority Data

Dec. 12, 2005   (JP) ................................. 2005-358228

(51) Int. Cl.
*G05B 19/408* (2006.01)
*G10L 11/00* (2006.01)
*G06F 19/00* (2006.01)

(52) U.S. Cl. .................... 700/253; 700/245; 318/568.12; 318/568.23

(58) Field of Classification Search .................. 700/245, 700/246, 253, 257, 264; 704/270, 272, 275; 446/297, 404; 367/198, 137, 118; 318/568.12, 318/568.13, 568.23; 901/1, 50
See application file for complete search history.

(56) References Cited

U.S. PATENT DOCUMENTS

| | | | |
|---|---|---|---|
| 6,604,021 B2 * | 8/2003 | Imai et al. ..................... | 700/245 |
| 2005/0065652 A1 * | 3/2005 | Sakagami et al. ............ | 700/245 |
| 2007/0198129 A1 * | 8/2007 | Koselka et al. ............... | 700/245 |

FOREIGN PATENT DOCUMENTS

| | | |
|---|---|---|
| EP | 0 958 897 A1 | 11/1999 |
| JP | 2003-340764 | 12/2003 |
| JP | 2004-114178 | 4/2004 |
| JP | 2004-299026 | 10/2004 |
| JP | 2004-302905 | 10/2004 |
| JP | 2005-066745 A | 3/2005 |
| JP | 2005-291716 | 10/2005 |
| WO | WO 02/40224 A1 | 5/2002 |

OTHER PUBLICATIONS

Ohya et al., "Intelligent Escort Robot Moving together with Human—Interaction in Accompanying Behavior" FIRA Robot Congress, 2002.*
Ishiguro et al., "Development of an Interactive Humanoid Robot "Robovie"—An interdisciplinary approach", Robotics Research, STAR 6, pp. 179-191, 2003.*
Tachi et al., "Guide Dog Robot", International Symposium on Robotics Research, vol. 2, pp. 333-340, MIT Press, 1984.*
German Office Action dated Jun. 30, 2009.
Official Communication issued in the corresponding JP Application No. 2005-358228, mailed on Dec. 22, 2009.

* cited by examiner

*Primary Examiner* — Thomas G Black
*Assistant Examiner* — Christine Behncke
(74) *Attorney, Agent, or Firm* — Squire, Sanders & Dempsey (US) LLP (57) ABSTRACT

In a control system of a legged mobile robot having a body and legs connected to the body and driven by a leg actuator, there is provided an operation controller which identifies a human being like visitor to be conducted in a company building and the like, and controls operation of the leg actuator to conduct the identified visitor to a destination such as a reception room in the company building space along a route determined based on a map stored in a map database, while keeping pace with the visitor, thereby enabling to establish better communication with the visitor.

9 Claims, 12 Drawing Sheets

ARRIVAL TO DESTINATION

DESTINATION

LEGGED MOBILE ROBOT CONTROL SYSTEM

CROSS REFERENCE TO RELATED APPLICATION

This invention claims priority under 35 USC 119 based on Japanese Patent Application No. 2005-358228, filed on Dec. 12, 2005, the entire disclosure of which is incorporated herein by reference.

BACKGROUND OF THE INVENTION

1. Field of the Invention

This invention relates to a legged mobile robot control system, particularly to a system for controlling a legged mobile robot configured to be capable of conducting or guiding a human being to a destination such as a reception room of a company where the robot is placed.

2. Description of the Related Art

It has hitherto been proposed a technique in which a legged mobile robot is controlled to conduct or guide a visitor in a company or some similar places, as taught by Japanese Laid-Open Patent Application No. 2004-299026, for example. In the prior art mentioned in this reference, all visitors are detected from cameras installed at the entrance, exit, etc., of the company to be conducted to their destinations effectively.

To be more specific, in the prior art, every visitor is photographed to have his/her face image, information including ID of the visitor is then prepared from the face image with consent of the visitor, and the robot is controlled to conduct the visitors in accordance with the information, thereby enabling to effectively conduct the visitors one by one to their destinations.

However, the prior art is not always satisfactory, since the robot is not controlled to conduct the visitors while keeping pace with the visitors. For example, the robot is not controlled to ascertain if the visitors follow during conducting. With this, the prior art is not always satisfactory in establishing communication with the visitors.

SUMMARY OF THE INVENTION

An object of this invention is therefore to solving the foregoing drawback of the prior art by providing a legged mobile robot control system that can be controlled to conduct human beings like visitors while keeping pace therewith, thereby enabling to establish better communication with the human beings.

In order to achieve the object, this invention provides a system for controlling a legged mobile robot having a body, a plurality of legs and arms each connected to the body, a leg actuator for driving the legs and an arm actuator for driving the arms, comprising: a map database which stores a map of environmental space where the robot moves; and an operation controller which identifies one of human beings to be conducted, and controls operation of at least the leg actuator to conduct the identified human being to a destination in the space along a route determined based on the map, while keeping a predetermined distance from the human being.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A preferred embodiment of a legged mobile robot control system according to the invention will now be explained with reference to the attached drawings.

Figure 1:
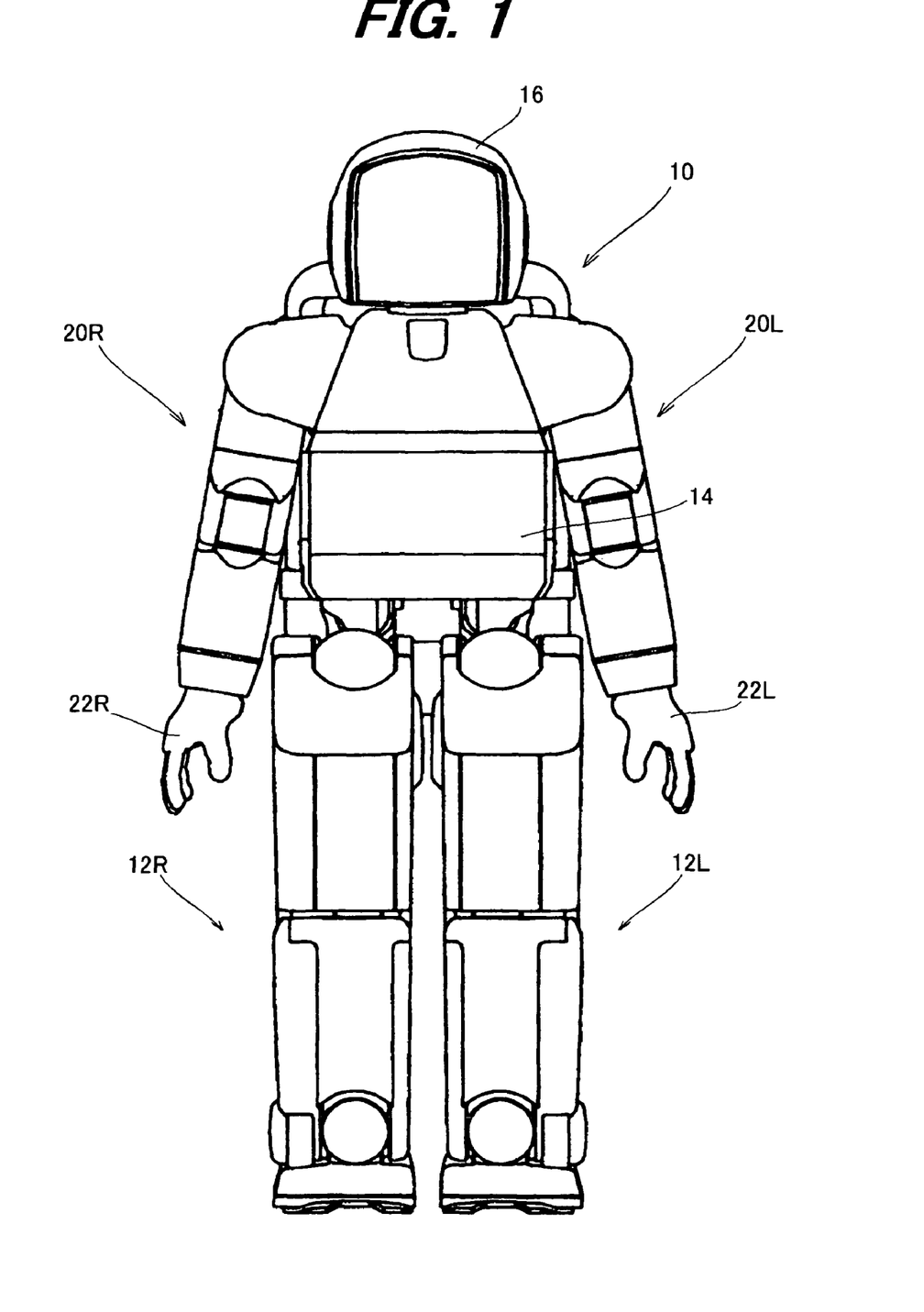
FIG. 1 is a front view of a legged mobile robot to which a legged mobile robot control system according to an embodiment of the invention is applied.
Figure 2:
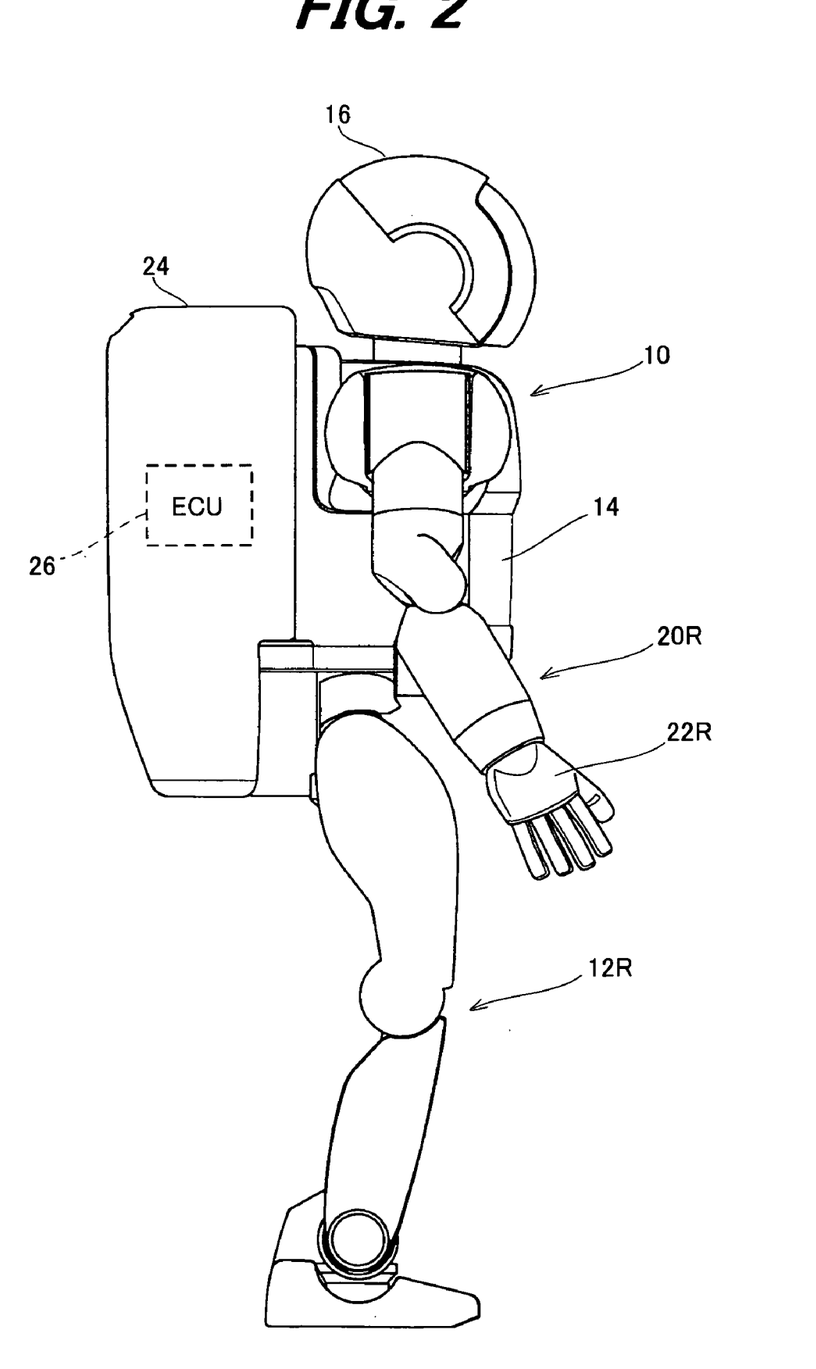
FIG. 2 is a side view of the robot shown in FIG. 1.

FIG. 1 is a front view of a legged mobile robot to which a legged mobile control system according to an embodiment of the invention is applied and FIG. 2 is a side view of the robot.

As shown in FIG. 1, the legged mobile robot (hereinafter referred to as "robot") 10 is equipped with a plurality of, specifically a pair of right and left legs 12R, 12L (R and L indicating the right and left sides; hereinafter the same). The legs 12R, 12L are connected to the lower end of a body (upper body) 14. A head 16 is connected to the upper end of the body 14 and a plurality of, specifically a pair of right and left arms 20R, 20L are connected to opposite sides of the body 14. Hands (end effectors) 22R, 22L are attached to the distal ends of the arms 20R, 20L.

A humanoid legged mobile robot (mobile robot modeled after the form of the human body) provided with two legs and two arms, in approximately 1300 mm height, and capable of bipedal locomotion, is taken as an example of the legged mobile robot.

As shown in FIG. 2, a housing unit 24 is mounted on the back of the body 14 for accommodating an electronic control unit (hereinafter referred to as "ECU") 26, a battery and the like. The robot 10 shown in FIGS. 1 and 2 is equipped with covers for protecting its internal structures.

Figure 3:
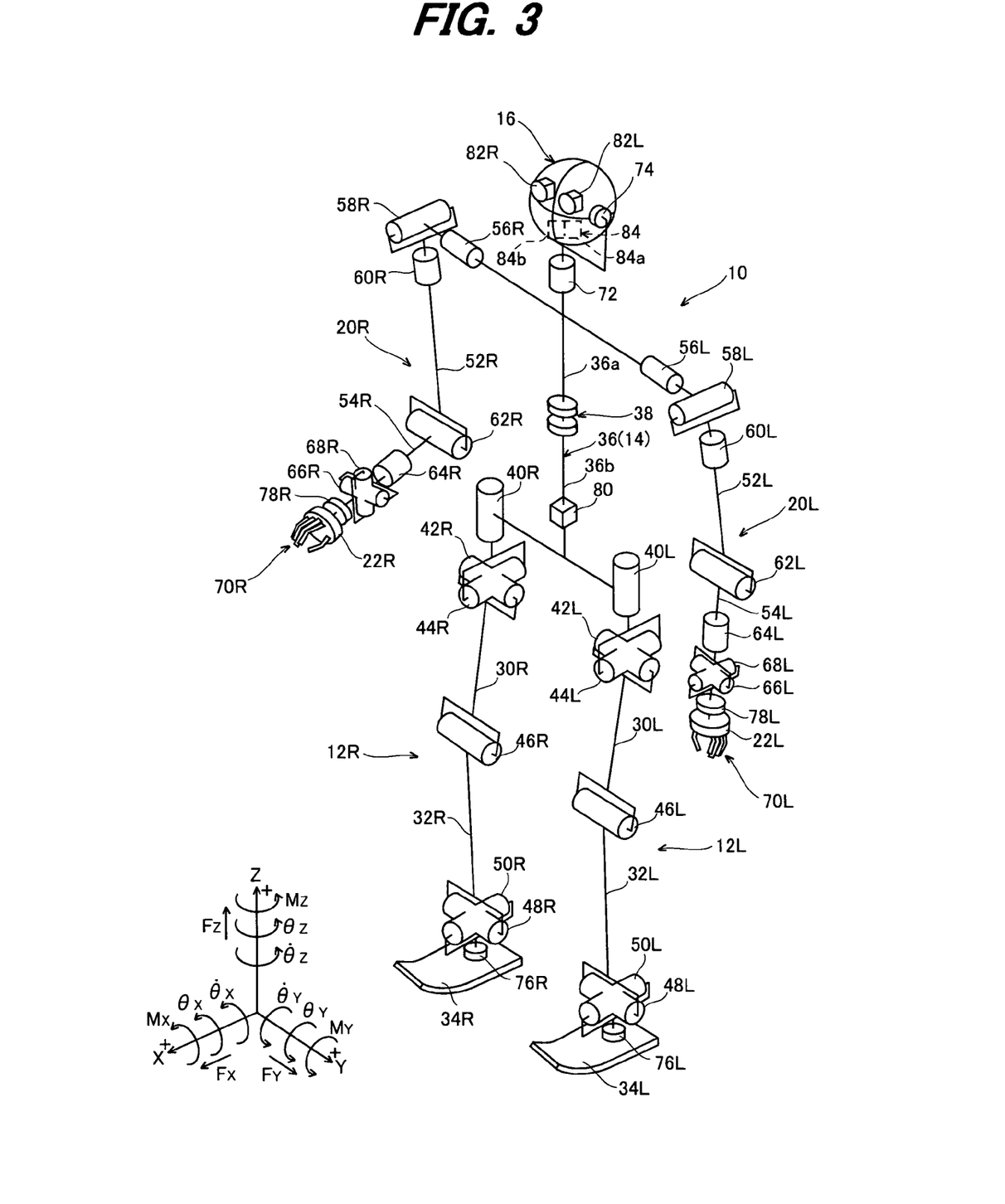
FIG. 3 is an explanatory view showing a skeletonized view of the robot shown in FIG. 1.

FIG. 3 is an explanatory diagram showing a skeletonized view of the robot 10. The internal structures of the robot 10 will be explained with reference to this drawing, with primary focus on the joints. Since the robot 10 is symmetric with respect to the right and left, the addition of R, L will be omitted in the followings.

As illustrated, each of the right and left legs 12 has a thigh link 30, a shank link 32 and a foot 34. The thigh link 30 is connected to the body 14 through hip (crotch) joint. The body 14 is represented in FIG. 3 simply by a body link 36 whose upper half 36a and lower half 36b are made displaceable with each other, i.e., rotatable with each other.

The thigh link 30 and the shank link 32 are connected by a knee joint, while the shank link 32 and the foot 34 are connected by an ankle joint. The hip joint comprises a rotary shaft 40 rotatable about a Z-axis (yaw axis or vertical axis), a rotary shaft 42 rotatable about a Y-axis (pitch axis; an axis in the right-and-left direction of the robot 10), a rotary shaft 44 rotatable about an X-axis (roll axis; an axis in the back-and-forth direction of the robot 10). The hip joint has three degrees of freedom.

The knee joint comprises a rotary shaft 46 rotatable about the Y-axis and has one degree of freedom. The ankle joint comprises a rotary shaft 48 rotatable about the Y-axis and a rotary shaft 50 rotatable about the X-axis and has two degrees of freedom. Thus, the each of the right and left legs 12 is imparted with six rotary shafts (six degrees of freedom) constituting the three joints and hence, the right and left legs 12 have twelve rotary shafts as a whole.

The legs 12 are driven by actuators (not shown). The actuators that drive the legs 12 (hereinafter generally referred to as "leg actuator") comprise twelve electric motors installed at the body 14 and the legs 12 which drive the aforesaid twelve rotary shafts respectively. The legs 12 can thus be imparted with desired movement when the operation of the leg actuator is controlled to drive the respective rotary shafts to appropriate angles.

Similarly, each of the right and left arms 20 has an upper arm link 52 and a lower arm link 54. The upper arm link 52 is connected to the body 14 through a shoulder joint. The upper arm link 52 and the lower arm link 54 are connected by an elbow joint, while the lower arm link 54 and the hand 22 are connected by a wrist joint.

The shoulder joint comprises a rotary shaft 56 rotatable about the Y-axis, a rotary shaft 58 rotatable about the X-axis and a rotary shaft 60 rotatable about the Z-axis, and have three degrees of freedom. The elbow joint comprises a rotary shaft 62 rotatable about the Y axis and has one degree of freedom. The wrist joint comprises a rotary shaft 64 rotatable about the Z-axis, a rotary shaft 66 rotatable about the Y-axis and a rotary shaft 68 rotatable about the X-axis and has three degrees of freedom. Thus, the each of the right and left arms 20 is imparted with seven rotary shafts (seven degrees of freedom) constituting the three joints and hence, the right and left arms 20 have fourteen rotary shafts as a whole.

The arms 20 are also driven by actuators (not shown). The actuators that drive the arms 20 (hereinafter generally referred to as "arm actuator") comprise fourteen electric motors installed at the body 14 and the arms 20 which drive the aforesaid fourteen rotary shafts respectively. The arms 20 can be imparted with desired movement when the operation of the arm actuator is controlled to drive the respective rotary shafts to appropriate angles.

The hands 22 are each equipped with five fingers 70 which are configured to be driven by actuators (not shown; hereinafter generally referred to as "hand actuator") to carry out a task, such as grasping an object, pointing a certain direction, in cooperation with the movement of the arms 20.

The head 16 is connected to the body 14 through a neck joint. The neck joint comprises a rotary shaft 72 rotatable about the Z-axis and a rotary shaft 74 rotatable about the Y-axis and has two degrees of freedom. The rotary shafts 72, 74 are configured to be driven by actuators (not shown; hereinafter generally referred to as "head actuator") respectively. The head 16 can be moved to turn the face of the robot 10 to a desired direction when the operation of the head actuator is controlled to drive the respective rotary shafts 72, 74 to appropriate angles.

A force sensor (six-axis force sensor) 76 is attached to each of the right and left legs 12 at a location between the foot 34 and the ankle joint. The force sensor 76 produces signals representing the force components Fx, Fy and Fz of three directions and the moment components Mx, My and Mz of three directions of the floor reaction force acting from the floor to the legs 12, more precisely the floor reaction force acting on the robot 10 through the legs 12.

Similar force sensor (six-axis force sensor) 78 is also attached to each of the arms 20 at a location between the wrist joint and hand 22 and produces signals representing force components Fx, Fy and Fz of three directions and moment components Mx, My and Mz of three directions of external force acting on the hands 22 and arms 20, more specifically external force acting on the robot 10 through the hands 22 and arms 20.

In addition, an inclination sensor 80 is installed on the body 14 and produces a signal representing the quantity of state including the inclination of the body 14, i.e., the inclination angle and angular velocity of the body 14 relative to the vertical axis (Z-axis). The interior of the head 16 is equipped with a pair of right and left CCD cameras 82 which can produce stereoscopic images of the environmental space, and a voice input/output device 84 comprising a microphone 84a and a speaker 84b.

The outputs of the force sensors 76 etc., are inputted to the ECU 26 (shown in FIG. 2) that comprises a microcomputer having a CPU, input/output circuits, a ROM and a RAM, etc.

Figure 4:
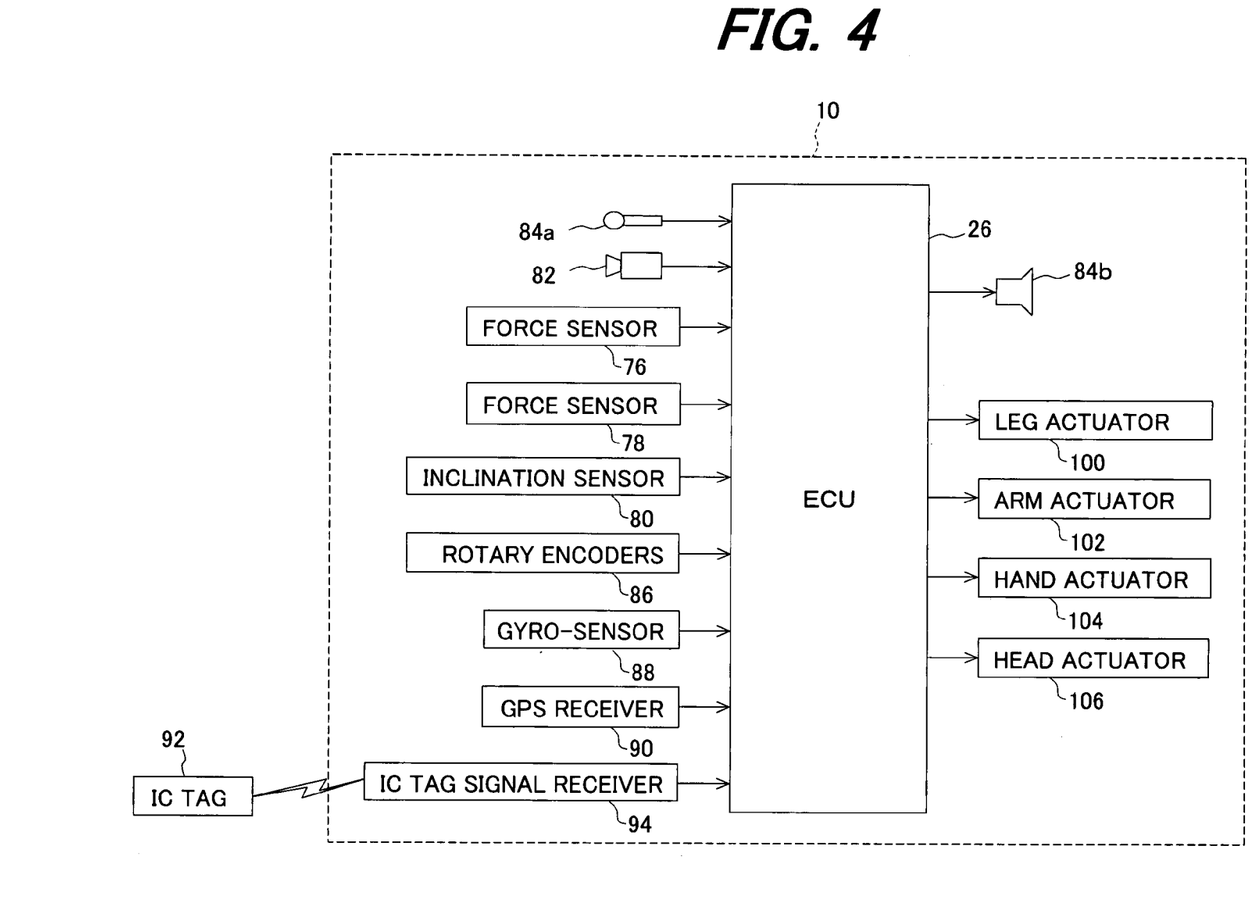
FIG. 4 is a block diagram showing the configuration of the robot through inputs to and outputs from an electronic control unit (ECU) illustrated in FIG. 2.

FIG. 4 is a block diagram showing the configuration of the robot 10 through inputs to and outputs from the ECU 26.

In addition to the aforesaid sensors, the robot 10 is equipped with rotary encoders (generally assigned by reference numeral 86) each installed at the respective rotary shafts 40, 42, 44, . . . , a gyro-sensor 88, a GPS (Global Position System) receiver 90, an IC tag signal receiver or reader 94 which receives an IC tag information transmitted from an IC tag 92 each carried by visitors in radio communication.

Each of the rotary encoders 86 produces a signal or output indicative of the angle of rotation, i.e., the joint angle of the associated rotary shafts 40, 42, 44, . . . . The gyro-sensor 88 produces a signal or output indicative of the direction and distance that the robot 10 moves. The GPS receiver 90 receives radio wave transmitted from a satellite to acquire positional information in latitude and longitude and outputs it to the ECU 26. The IC tag signal receiver 94 receives the IC tag information that is RFID (Radio Frequency Identification) information to identify a person who carries the corresponding IC tag 92 and outputs it to the ECU 26.

The ECU 26 generates gaits based on the outputs from the force sensors 76, 78, inclination sensor 80 and rotary encoders 86 and performs walking control based on the generated gaits. Specifically, the ECU 26 controls operation of the leg actuator (now assigned with reference numeral 100 in the figure) to drive the legs 12 such that the robot 10 moves or walks.

At the same time, the ECU 26 controls operation of the arm actuator (now assigned with reference numeral 102) and the hand actuator (now assigned with reference numeral 104) to drive the arms 20 and hands 22, and controls operation of the head actuator (now assigned with reference 106) to move the head 16 so as to turn the robot face to an appropriate direction. Since the walking of the robot 10 is controlled in the same manner as described in International Laid-Open Patent Application WO 02/40224 A1 filed by the applicant, the explanation is omitted here.

In addition, the ECU 26 operates to conduct human beings like visitors by identifying the visitors based on the outputs from the CCD cameras 82 and IC tag signal receiver 94, etc.

Figure 5:
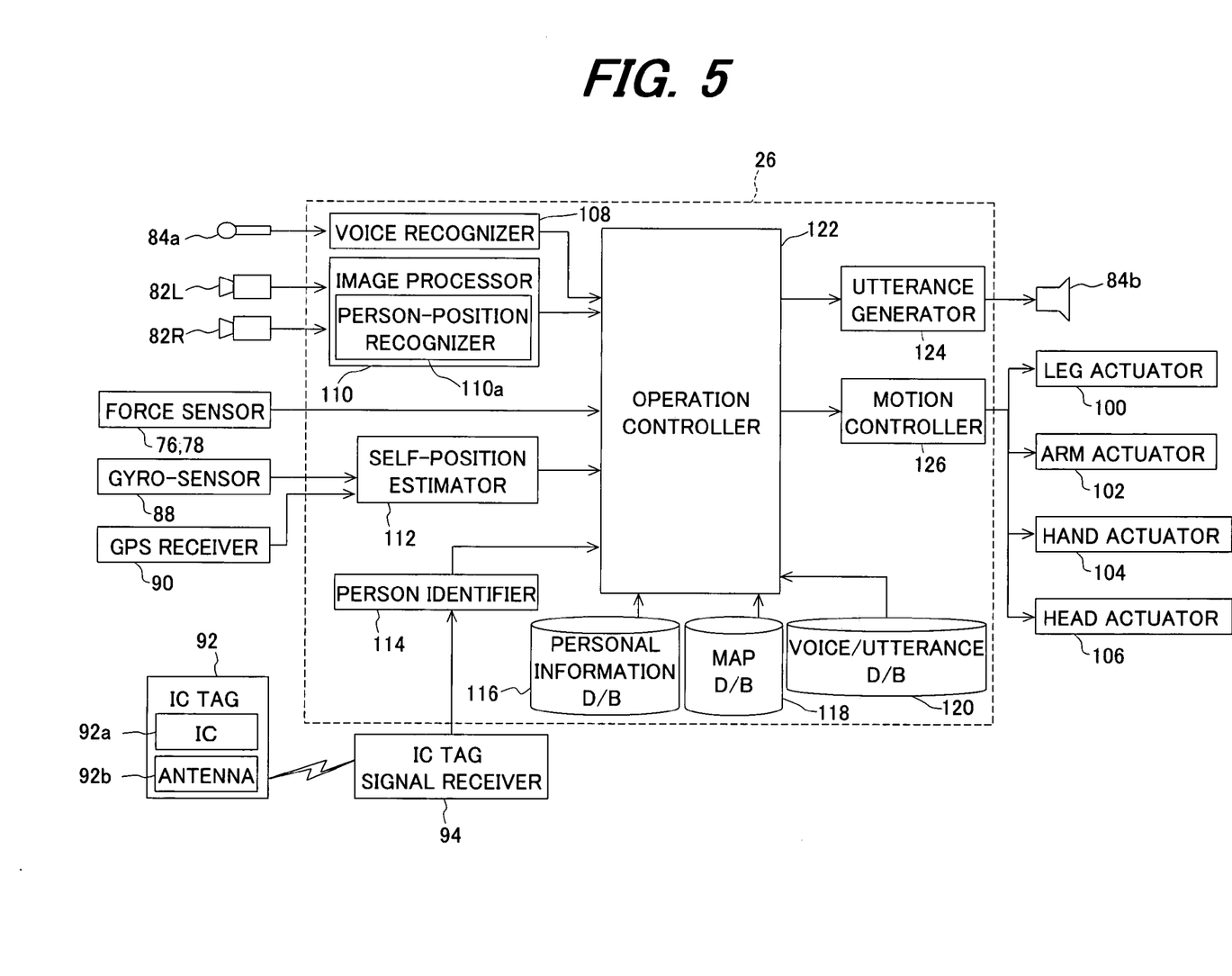
FIG. 5 is a block diagram functionally showing the operation of the electronic control unit illustrated in FIG. 4.

FIG. 5 is a block diagram showing the configuration of the ECU 26 for the visitor conducting operation in a functional manner.

As illustrated, the ECU 26 is equipped with, inter alia, a voice recognizer 108, image processor 110, self-position estimator 112, person identifier 114, personal information database (D/B) 116, map database (D/B) 118, voice/utterance database (D/B) 120, operation controller 122, utterance generator 124 and motion controller 126.

They will be explained individually. The voice recognizer 108 inputs the voices of visitors, operator and the like collected from the microphone 84a of the voice input/output device 84 and recognizes instruction or intention of the visitors and the like based on vocabulary stored in the voice/utterance database 120.

The image processor 110 has a person-position recognizer 110a which inputs the stereoscopic images taken and produced by the two CCD cameras 82 and from parallax of the inputted stereoscopic images, creates distance information of the object. The person-position recognizer 110a inputs images taken by one of the CCD cameras 82 at different times, calculates differences between the images to extract regions where the object moves, and recognizes the position of the person (visitor) and the distance to the person.

The self-position estimator 112 estimates the current position of the robot 10 based on the GPS signal inputted through the GPS receiver 90. When the GPS signal is absent, it estimates the position based on the direction and distance of the robot 10 detected by the gyro-sensor 88.

Based on the identification signal (RFID information) of the IC tag 92 inputted through the IC tag signal receiver 94, the person identifier 114 identifies a person like visitor, more specifically the person whose position is recognized by the person position recognizer 110a. The IC tag 92 is carried by every person and comprises an Integrated Circuit 92a that stores the identification signal of the carrying person, and an antenna 92b that transmits the identification signal to the IC tag signal receiver 94 in radio communication, etc. Needless to say, the different IC tag 92 contains different identification information.

The personal information database 116 stores the personal information of the every human being, i.e., every visitor who carries the IC tag 92. The personal information comprises height, sex, face image and any other information including social character such as the name of organization the visitor belongs to. The map database 118 stores a map (map information) of the walking environment such as the building of a company where the robot 10 is placed. The voice/utterance database 120 stores the aforesaid vocabulary or words.

The operation controller 122 determines visitor conducting operation to identify the visitor and to conduct or guide the visitor to a destination such as a reception room, a conference room or the like, and controls operation of the leg actuator 100, arm actuator 102, hand actuator 104 and head actuator 106 through the motion controller 126. Further, the operation controller 122 generates synthesized voice signal and drives the speaker 84b of the voice input/output device 84 to utter words.

Figure 6:
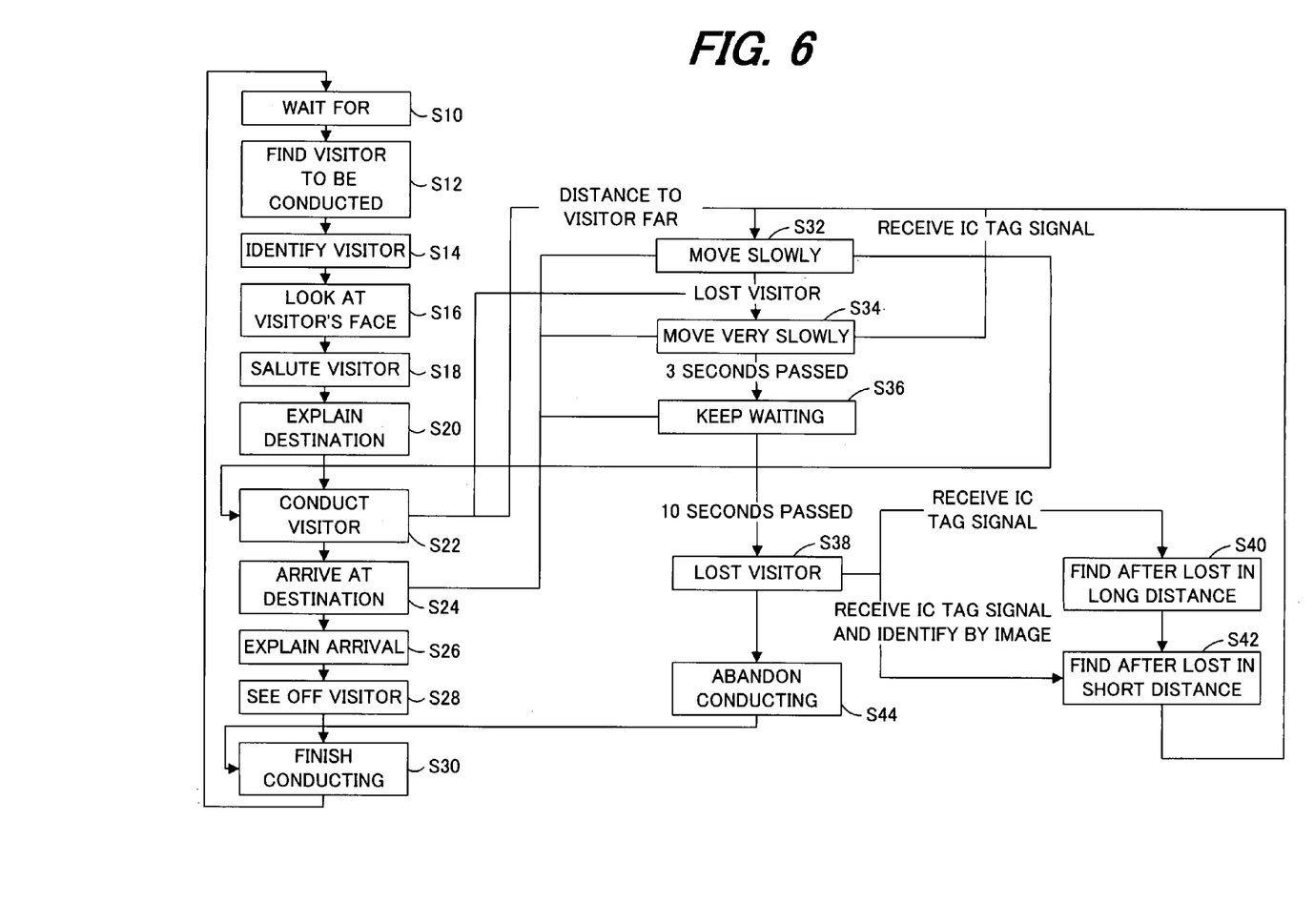
FIG. 6 is a flowchart showing the operation of the electronic control unit illustrated in FIG. 5.

This visitor conducting operation performed by the operation controller 122 will be explained with reference to the flowchart of FIG. 6. The operation mentioned there is based on the assumption that the robot 10 waits for visitors near a reception counter of a company to conduct them to reception rooms.

First in S10, the robot 10 is controlled to stand at a position near the reception counter of the company. This is the initial state of the operation.

In S12, upon receiving the IC tag signal, the robot 10 is controlled to find or search or identify the visitor to be conducted (visitor named "Mr. A"). Specifically, the operation of the head actuator 106 of the robot 10 is controlled, through the motion controller 126, to turn the head 16 so as to look around, and the speaker 84b is driven through the utterance generator 124 to utter or speak at every 15 seconds as "I am looking for Mr. A".

At the same time, the robot 10 is controlled to find the visitor based on the output of the image processor 110, i.e., the images taken by the CCD cameras 82 and processed by the image processor 110 and the face image of the visitor stored in the personal information database 116. It is also controlled to find the visitor by receiving the identification signal being transmitted from the IC tag 92 (carried by the visitor) by the IC tag signal receiver 94.

The detection range of the IC tag 92 and image should be set within several meters such that the robot 10 can recognize based on the information of the IC tag signal and image whether the visitor (to be conducted) is present within several meters therearound (i.e., in all directions (360 degrees)), in other words whether the visitor exists within a predetermined distance in the walking environment. Even after the visitor has been identified, the determination whether the visitor remains present within the predetermined distance is kept continued during conducting.

When the robot 10 identified the visitor, next in S14, it is controlled to speak to the visitor as "Welcome, Mr. A" so as to let the visitor to stop walking. Then, the robot 10 is controlled to approach the visitor to a position where the robot 10 can almost face or confront the visitor.

Figure 7:
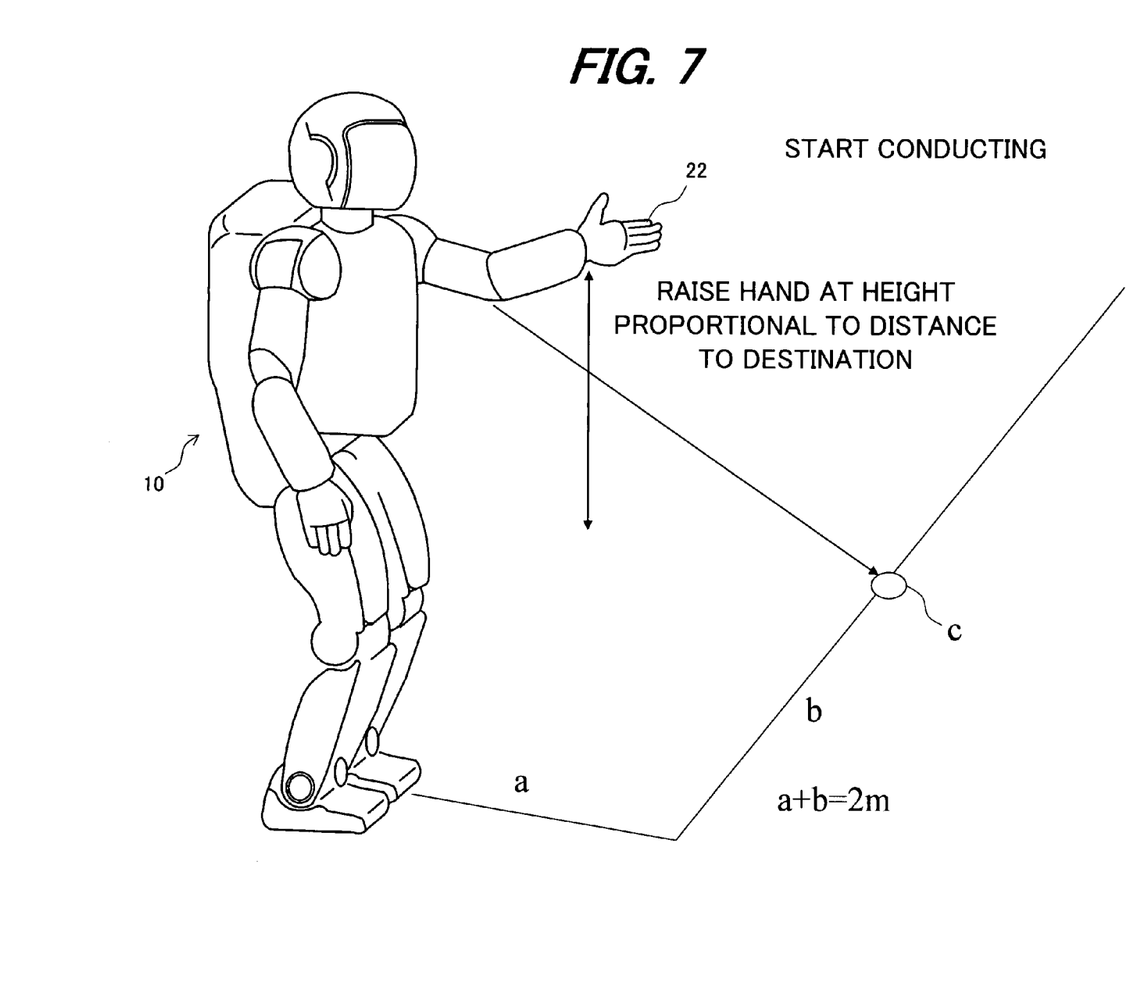
FIG. 7 to FIG. 12 are explanatory views each explaining the operation illustrated in the flowchart of FIG. 6.

Next in S16, the robot 10 is controlled to look at the visitor's face and in S18, it is controlled to bow to or salute the visitor. Then in S20, it is controlled to explain the destination to the visitor. Specifically, it is controlled to speak as "I will take you to reception room 3. Please come this way," and as shown in FIG. 7, it is controlled to raise one of the hands 22.

More specifically, the robot 10 is controlled to raise one hand 22R or 22L to a height (from the floor) proportional to the distance to the destination. For example, if it is assumed that the distance to the reception room 3 is about 20 meters, the robot 10 is controlled to raise one hand to the height of 1 meter. In FIG. 7, "a","b" are positional parameters and "c" is the closest node indicating the direction of the elbow on the map stored in the map database 118.

Next in S22, the robot 10 is controlled to start conducting along a route determined based on the map stored in the map database 118. Specifically, it is controlled to recognize the route up to reception room 3 based on the map information of the company building stored in map database 118, and to start for the destination in accordance with the route. It is also controlled to walk ahead of the visitor by an appropriate distance, e.g., 3.5 meters, as mentioned below.

The operation of the head actuator 106 is controlled in such a way that the robot face looks to the front during walking, but the robot face looks back to see the visitor's face when the robot 10 speaks thereto. The moving speed of the robot 10 is normally controlled to 2.7 km/h. As mentioned above, the robot 10 is kept controlled to ascertain if the visitor follows, i.e., if the visitor remains present in the predetermined distance in the walking environment based on the identification signal from the IC tag 92 and the output of the image processor 110.

The robot 10 is controlled to utter (speak) by selecting long or short words from the remaining distance in the way to the destination. For example, it is controlled to speak as "Please order a favorite drink to a person in charge. He/She will bring it later," when the remaining distance is relatively long. It is also controlled to speak as "We appreciate your today's visit very much," when the distance is medium, or to speak as "Thank you very much for your visit," when the distance is short. The robot 10 is thus controlled to speak these words during conducting.

Figure 8:
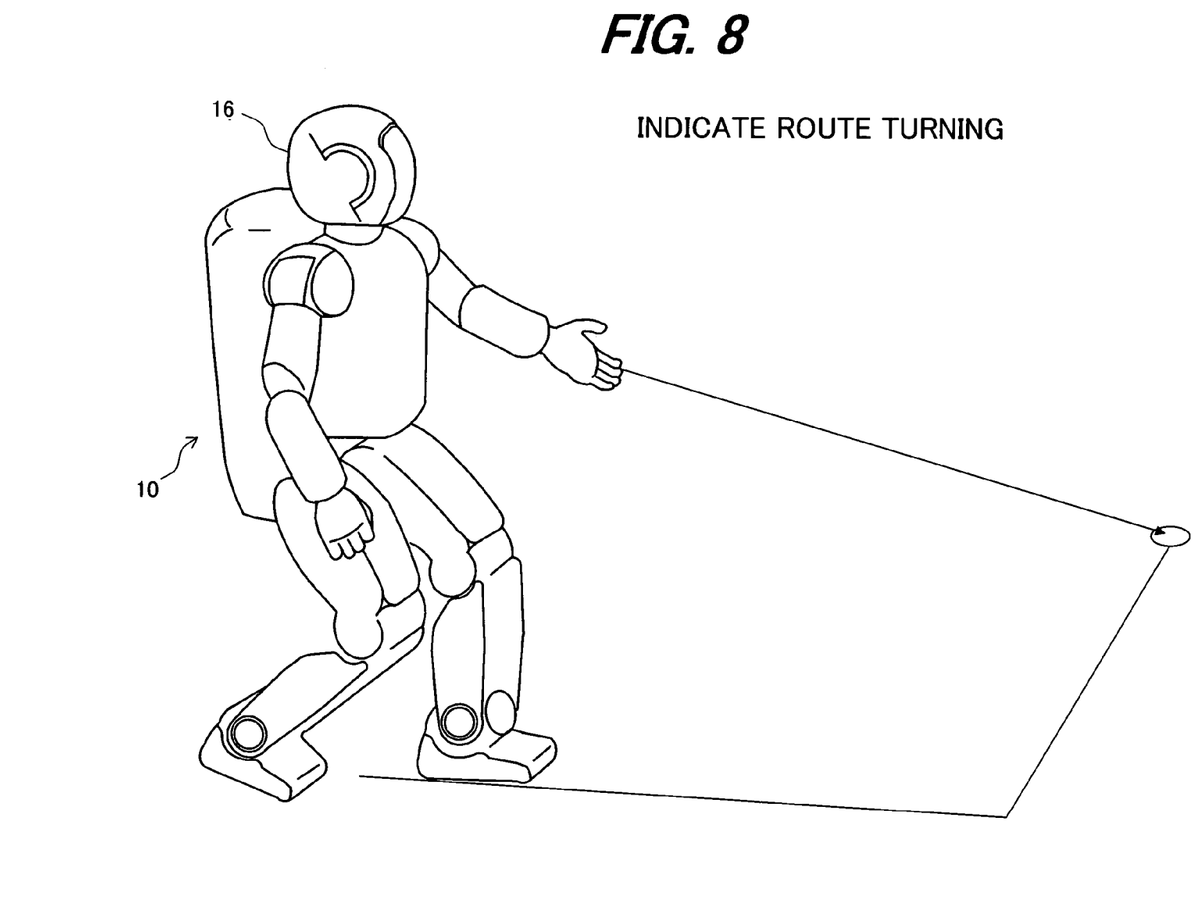

As shown in FIG. 8, when the route breaks in the middle and turns to the right or left, the robot 10 is controlled to indicate an appropriate position in the turned route, to speak as "Over there,", while turning the face to that position.

Figure 9:
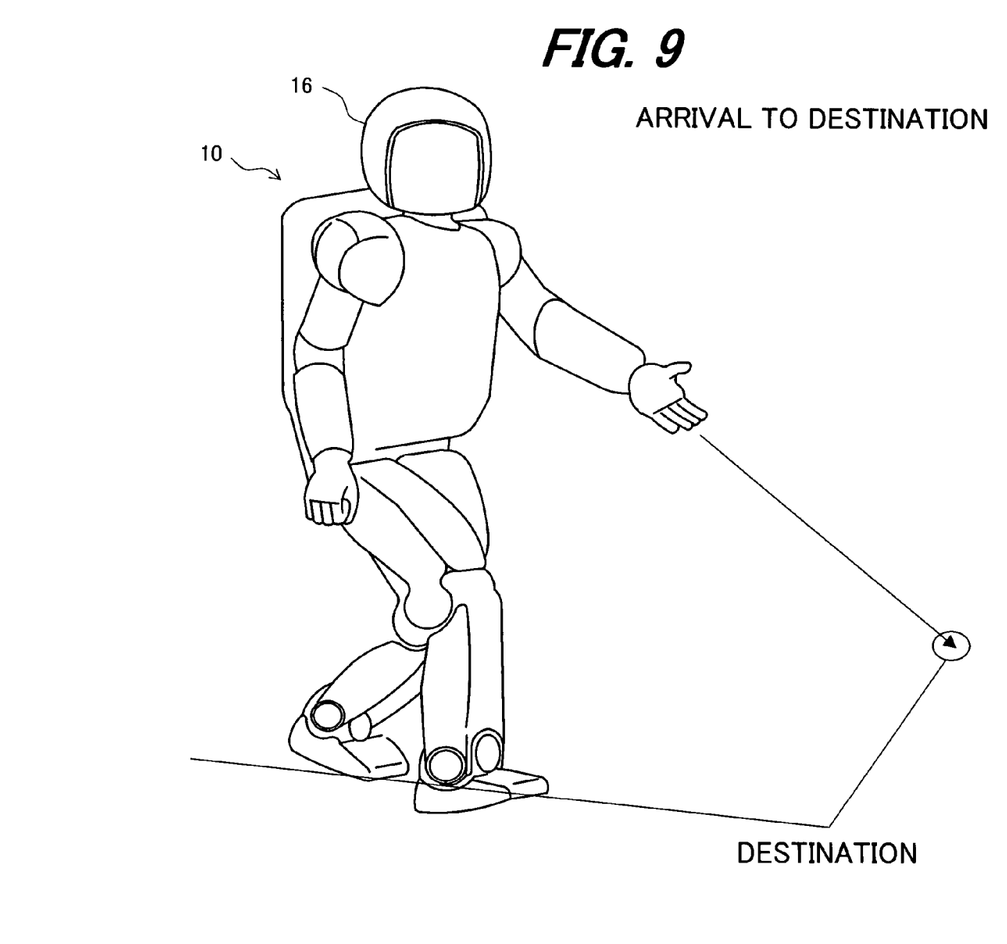

Next in S24, when the robot 10 arrives at the destination, more precisely when the robot 10 approaches the destination, arrival processing is performed and in S26, the robot 10 is controlled to announce the arrival to the visitor. Specifically, as shown in FIG. 9, it is controlled to turn the head 16 to face to the visitor at a position slightly (e.g., 3 meters) before the destination, to indicate the destination, and to speak as "Here it is. Please wait here. The person in charge will be here."

Next in S28, the robot 10 is controlled to see the visitor off, specifically, see the visitor off for reception room 3 and then to bow to the visitor. Next in S30, it is determined that conducting has been finished and back to S10.

The processing in S22 is again explained in more detail.

The robot 10 is controlled to walk at the moving speed of 2.7 km/h during conducting, as mentioned above. However, if the distance to the visitor increases, the robot 10 is controlled in S32 such that the head 16 is turned back to look around and the walking speed is dropped to 2.1 km/h to move slowly. If the distance increases further, nevertheless, the robot 10 is controlled in S34 such that the walking speed is further dropped to 1.5 km/h to move very slowly. Thus the robot 10 is controlled to conduct the visitor at a moving speed that is in pace with a walking speed of the visitor.

Figure 10:
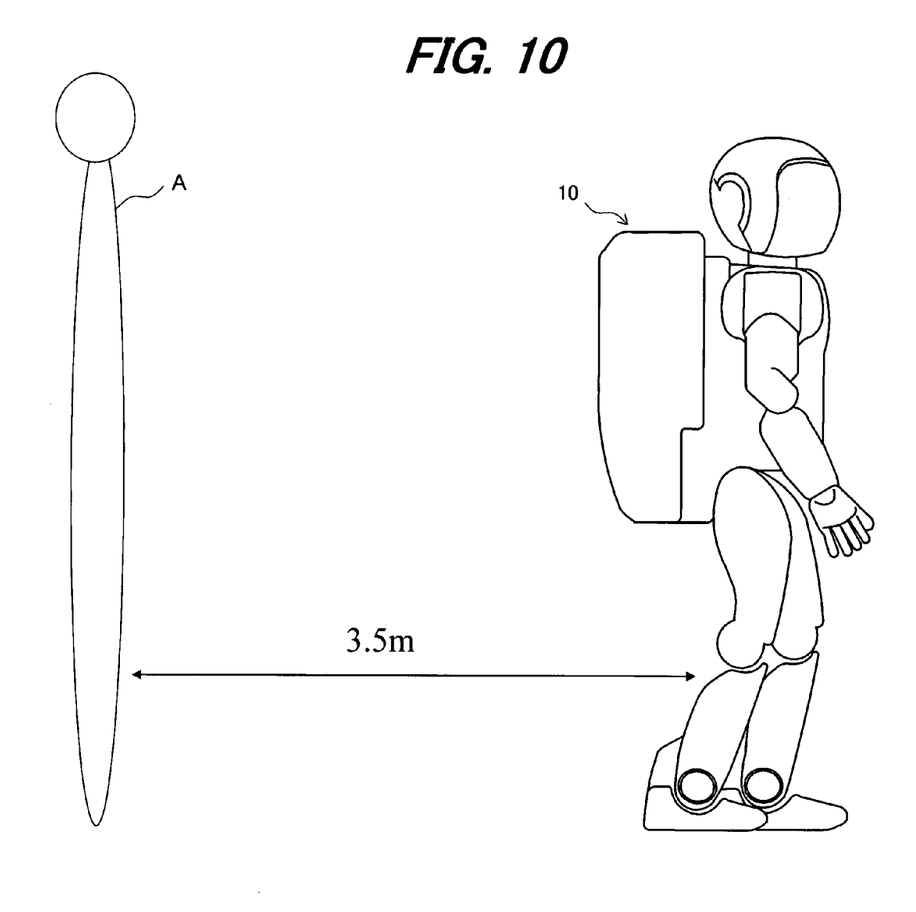
Figure 11:
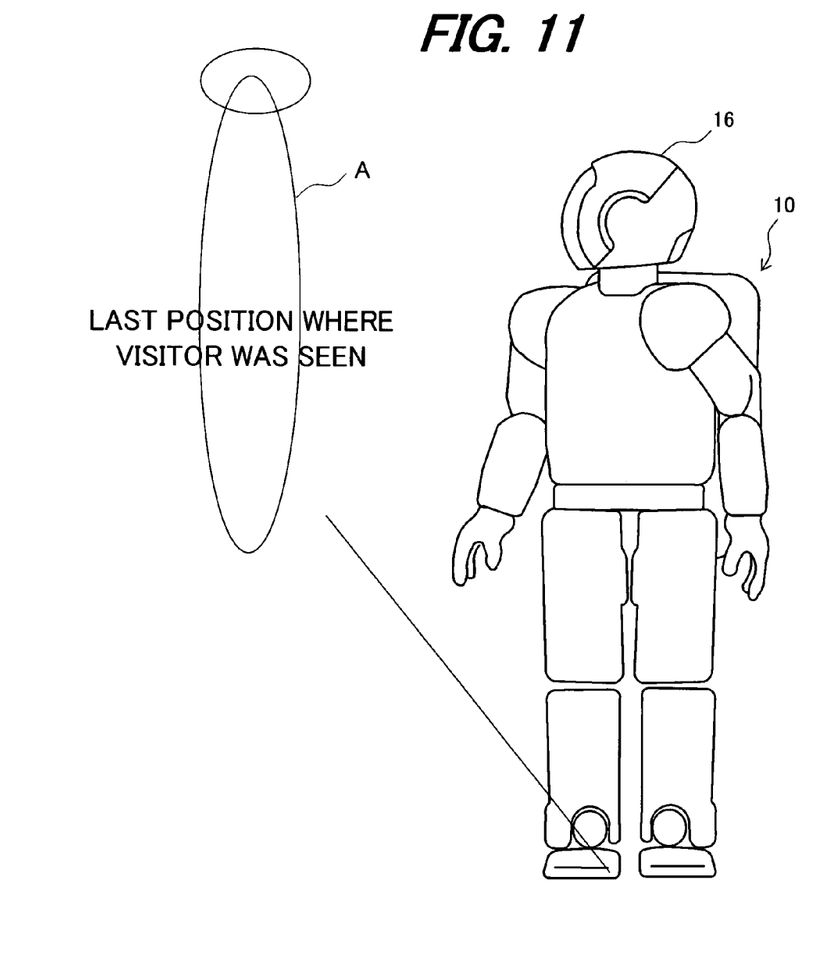
Figure 12:
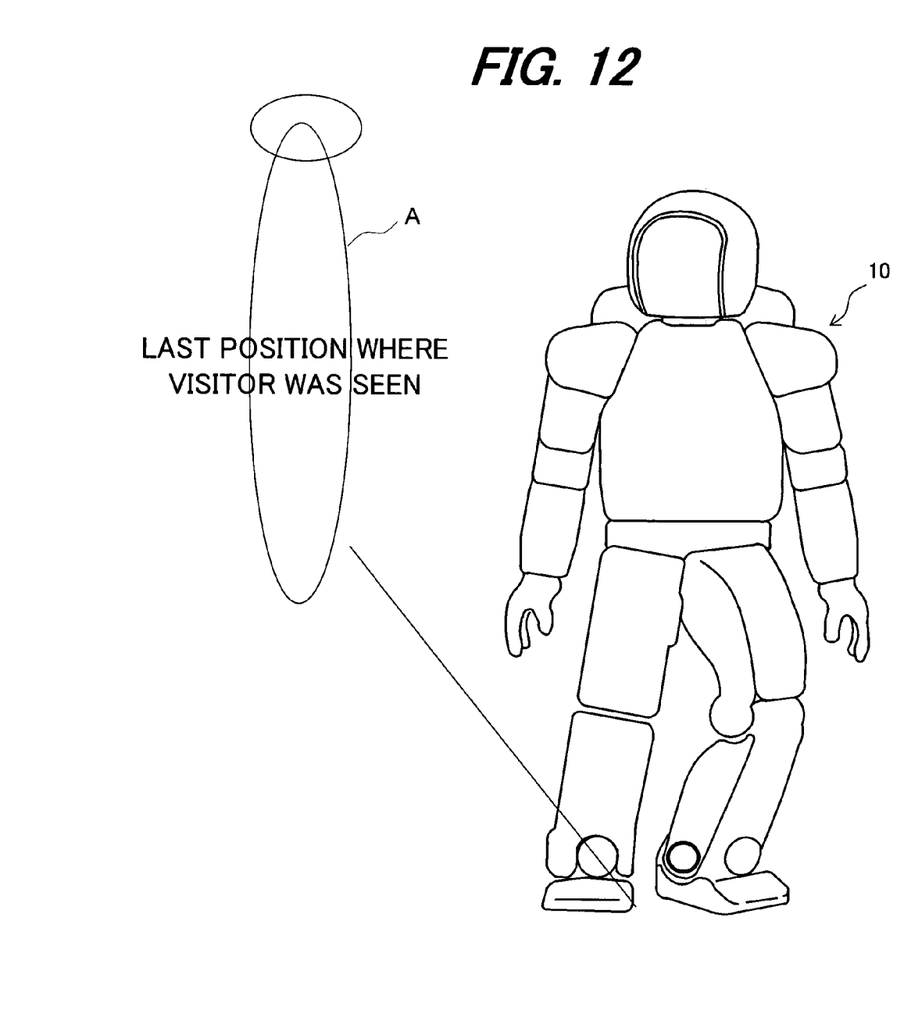

FIG. 10 shows such a situation. In the figure, "A" indicates the visitor to be conducted. The target distance to the visitor A is set to 3.5 meters, as mentioned above. Thus the robot 10 is controlled to conduct the visitor to a destination in the space along the route determined based on the map, while keeping a predetermined distance (i.e., 3.5 meters) from the visitor.

If the robot 10 lost the visitor, it is controlled in S34 to keep moving at the speed of 1.5 km/h for 3 seconds and to stop in S36 to wait for the visitor for 10 seconds. At that situation, the robot 10 is controlled to turn the face to the last position where it saw the visitor. If failed in finding the visitor, it is determined in S38 that the visitor is lost and the robot 10 is controlled to speak as "Where are you? Mr. A" and to look for the visitor by the IC tag information and the output of the image processor 110.

When the visitor is found in a relatively long distance, the robot 10 is controlled in S40 to approach toward the visitor, while speaking as "Mr. A.". When the visitor is found in a relatively short distance, the robot 10 is controlled in S42 to speak to the visitor as "Mr. A. Please follow me."

On the other hand, when the visitor has not been found within 30 seconds or thereabout, the robot 10 is controlled in S44 to abandon conducting, i.e., to turn the face to the front, to stop walking, and to speak that "I have lost you, Mr. A. I finish conducting" and to proceed to S30 to terminate the program.

The present exemplary embodiment is thus configured to have a system for controlling a legged mobile robot (10) having a body (14), a plurality of legs (12) and arms (20) each connected to the body, a leg actuator (100) for driving the legs and an arm actuator (102) for driving the arms, comprising: a map database (118) which stores a map of environmental space where the robot moves; and an operation controller (122; S10 to S44) which identifies one of human beings (visitors) to be conducted, and controls operation of at least the leg actuator (100) to conduct the identified human being to a destination in the space along a route determined based on the map, while keeping a predetermined distance from the human being.

Thus, since the system is configured to have an operation controller (122; S10 to S44) which identifies one of human beings (persons or visitors) to be conducted, and controls operation of at least the leg actuator (100) to conduct the identified human being to a destination in the space along a route determined based on the map, while keeping a predetermined distance from the human being, it becomes possible to ascertain if the human being follows surely, and to provide a legged mobile robot control system that conducts human beings while keeping pace therewith, thereby enabling to establish better communication with the human beings.

In the system, the operation controller controls operation of the leg actuator (100) to conduct the human being at a moving speed that is in pace with a walking speed of the human being (S22, S32 to S36). With this, it becomes possible to provide a legged mobile robot control system that conducts human beings while keeping pace therewith, thereby enabling to establish better communication with the human beings.

In the system, the operation controller controls operation of at least the leg actuator (100) to find the human being if the human being is lost during conducting (S22, S34 to S44). With this, it becomes possible to control the robot to move slowly or stop to wait for the human being, or to speak to the human being, thereby enabling to increase the chance to find the lost human being once again.

In the system, the operation controller controls operation of the arm actuator (102) to indicate when the route is turned (S22). With this, it becomes possible to control the robot to conduct the human being without causing the human being to feel unnatural, thereby enabling to establish better communication with the human beings.

The system further includes: an utterance generator (124) which generates utterance; and the operation controller controls operation of the utterance generator to speak to the human being during conducting (S22). With this, it becomes possible to control the robot to speak to the human being during conducting, thereby enabling to establish better communication with the human beings.

The system further includes: an IC tag signal receiver (94) which receives IC tag signals transmitted from IC tags (92) carried by the human beings; and the operation controller identifies the human being by identifying one of the IC tag signals corresponding to the one of the human beings (S12, S40, S42). With this, it becomes possible to control the robot to identify the human beings surely, thereby enabling to establish better communication with the human beings.

The system further includes: a CCD camera (82) installed at the robot for taking an image in the space; and the operation controller identifies the one of the human beings through the image, more precisely through an output of an image processor (110) which processes the image taken by the CCD camera (S12, S40, S42). With this, it becomes possible to control the robot to identify the human being surely, thereby enabling to establish better communication with the human beings.

The system further includes: a personal information database (116) which stores personal information of the human beings including their face images; and the operation controller identifies the one of the human beings through its face image (S12). With this, it becomes possible to control the robot to identify the human being surely, thereby enabling to establish better communication with the human beings.

The system further includes: a head actuator (106) for driving a head (16) connected to the body; and the operation controller controls operation of the head actuator to turn a face to see the human being (S16, S22, S26). With this, it becomes possible to control the robot to see or speak to the human being, thereby enabling to establish better communication with the human beings.

The system further includes: a head actuator (106) for driving a head (16); and the operation controller controls operation of the head actuator to turn a face to see the human being when speaking to the human being (S16, S22, S26). With this, it becomes possible to control the robot to speak to the human being, thereby enabling to establish better communication with the human beings.

It should be noted in the above that, although the identification signal is transmitted from the IC tag 92 to the IC tag signal receiver 94 through radio communication, it is possible to utilize identification technique disclosed in Japanese Laid-Open Patent Application 2005-291716.

It should also be noted in the above that, although a biped robot is disclosed as example of the legged mobile robot, this invention can be applied to the robot having three or more legs.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling a legged humanoid mobile robot having a body, a plurality of legs and arms each connected to the body, a leg actuator for driving the legs and an arm actuator for driving the arms, comprising:
    a map database configured to store a map of environmental space where the robot moves;
    an operation controller configured to identify one of human beings to be conducted, and control operation of at least the leg actuator to conduct the identified human being to a destination in the space along a route determined based on the map, while keeping a predetermined distance from the human being;
    a head actuator configured to drive a head connected to the body; and
    an utterance generator configured to generate utterance,
    wherein the operation controller controls operation of the leg actuator to conduct the human being at a moving speed that is in pace with a walking speed of the human being, controls operation of the head actuator to turn the head back so as to see the human being and operation of the leg actuator to decrease the moving speed when the distance from the human being increases during conducting, controls operation of the utterance generator to utter to the human being by selecting words according to a remaining of distance, and controls at least operation of the utterance generator to utter to the human being in order to look for the human being if the human being is lost during the conducting.

2. The system according to claim 1, wherein the operation controller controls operation of the arm actuator to raise one hand to a height proportional to the distance to the destination when the route is explained to the human being through the utterance generator.

3. The system according to claim 1, wherein the operation controller controls operation of the arm actuator to indicate when the route is turned.

4. The system according to claim 1, further comprising:
    the utterance generator configured to generate utterance, wherein the operation controller controls operation of the utterance generator to speak to the human being during conducting.

5. The system according to claim 4, further wherein the head actuator is configured to drive a head, wherein the operation controller controls operation of the head actuator to turn a face to see the human being when speaking to the human being.

6. The system according to claim 1, further comprising:
    the IC tag signal receiver configured to receive IC tag signals transmitted from IC tags carried by the human beings, wherein the operation controller identifies the human being by identifying one of the IC tag signals corresponding to the one of the human beings.

7. The system according to claim 1, further comprising:
    a CCD camera installed at the robot configured to take an image in the space, wherein the operation controller identifies the one of the human beings through the image.

8. The system according to claim 7, further comprising:
    a personal information database configured to store personal information of the human beings including their face images, wherein the operation controller identifies the one of the human beings through its face image.

9. The system according to claim 1, further wherein the head actuator is configured to drive a head connected to the body, wherein the operation controller controls operation of the head actuator to turn a face to see the human being.

* * * * *